Nov. 14, 1939.  E. DEARDORFF  2,179,587
VEHICLE WHEEL TRACTION
Filed April 25, 1938
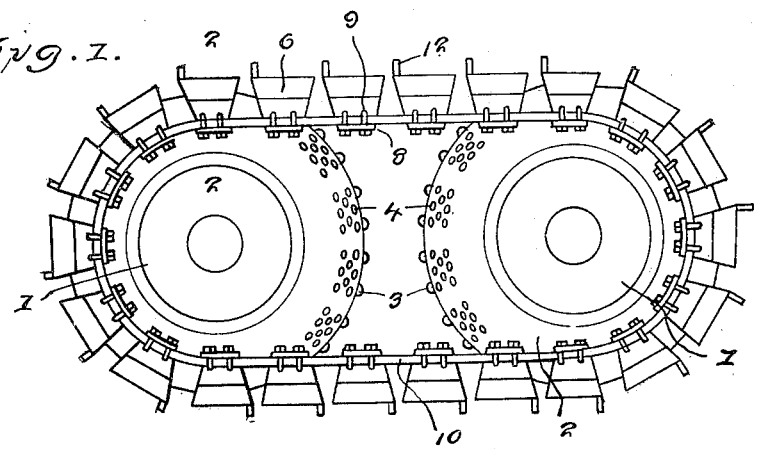
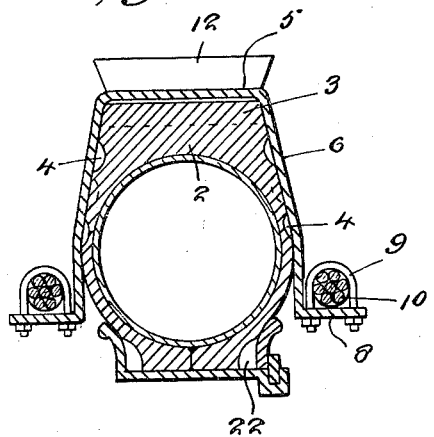
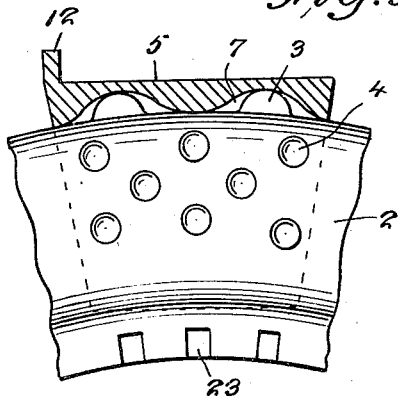
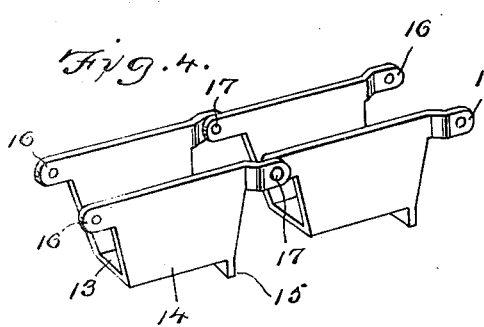
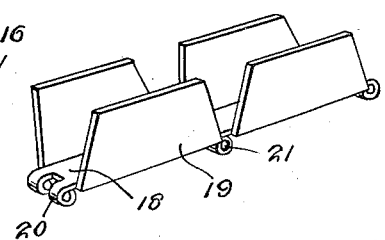
Earl Deardorff
INVENTOR
BY Victor J. Evans & Co.
ATTORNEYS Patented Nov. 14, 1939

2,179,587

UNITED STATES PATENT OFFICE 2,179,587

VEHICLE WHEEL TRACTION

Earl Deardorff, Portland, Oreg.

Application April 25, 1938, Serial No. 204,201

1 Claim. (Cl. 305—10)

This invention relates to vehicle traction, and its general object is to provide what may be termed a traction apparatus that is primarily designed for use upon the wheels of motor vehicles, particularly of the type known as tractors, and which includes dual tandem type wheels, in that the apparatus includes an endless belt for disposal about the wheels for travel thereon in accordance with the caterpillar principle.

The main object of the invention is to provide a traction belt that cooperates with the tire structure of the wheels, in that the belt includes shoes that not only set up a wedging gripping action with the tires, due to the shape of the shoes, and suction means on the tires, but the latter and the shoes are provided with interfitting means, with the result slippage of the belt with respect to the tires or casual displacement or removal therefrom is practically impossible regardless of the relative running positions of the wheels, it being obvious that the wheels travel at times in different planes, due to uneven ground surfaces.

Another object is to provide a traction belt that is free to bend, so as to accurately follow the circumferential curvature of the tire and in a manner to prevent any retrograde action or pull upon the same.

A further object is to provide a traction belt of the character set forth, that will not damage the tire and is capable of hard usage without possibility of disconnection of the shoes thereof.

A still further object is to provide a traction belt that can be easily and expeditiously applied and removed with respect to the tires and the apparatus in its entirety is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a side elevation illustrating my traction apparatus in its entirety, or in other words the traction belt and the tires that are constructed for cooperation therewith.

Figure 2 is a sectional view taken approximately on line 2—2 of Figure 1.

Figure 3 is a fragmentary side elevation of the tire with a shoe thereon and in section.

Figure 4 is a perspective view of a modified form of belt structure.

Figure 5 is a perspective view of a further modified form.

Referring to the drawing in detail, the reference numeral 1 indicates a pair of or dual wheels of a motor vehicle and which are of the usual construction, while the tires which are indicated by the reference numeral 2 are of a special construction for cooperation with the traction belt of my invention. While I have illustrated pneumatic tires, it will of course be understood that they may be of the solid or cushion rubber type.

In any event, the tires include converging side walls and flat tread surfaces, which have formed thereon and extending transversely thereof elongated projections 3 that are co-extensive with the width of the tread surface and are arranged in equi-distantly spaced relation thereabout, as indicated in Figure 1. The projections are preferably semi-circular in cross section, as best shown in Figure 3, and formed on the inclined side walls of the tire for disposal in staggered rows are depressions 4 that provide suction cups for a purpose which will be later described.

The traction belt of my invention in the form as shown in Figures 1 to 3, includes a plurality of shoes, each of which is identical and has a flat relatively thick tread wall 5 having formed on the side edges thereof diverging lateral walls 6 that follow the inclination of the side walls of the tire to set up a wedging action therewith, for cooperation with a suction action provided by the depressions or suction cups 4, for a purpose which will be later described.

The tread walls 5 are provided with a pair of recesses 7 in the inner surface thereof to receive a pair of projections 3, as best shown in Figure 3, and that feature together with the wedging and suction action, prevents any possibility of slippage of the shoe with respect to the tire or casual displacement or removal thereof.

The inner portions of the lateral wall 6 are disposed in substantially parallel relation with respect to each other and extending outwardly from the inner ends of the lateral walls for disposal at right angles thereto are flanges 8, each of which are provided with openings arranged in pairs for receiving U-clamping bolts 9, for fixing the shoes at equi-distantly spaced intervals upon endless cables 10.

Formed on and extending at right angles from at least one of the ends of the tread walls of each of the shoes, is a lug or calk 12 which is co-extensive with the tread wall and preferably has inwardly inclined or converging ends, as best shown in Figure 2. It will be obvious that a lug similar to 12 may be formed on the opposite ends of the tread walls.

In Figure 4, I have illustrated a modified form of shoe for the belt and this form likewise includes a tread wall 13, diverging lateral walls 14 and ground engaging or penetrating lugs 15 extending at right angles from the tread wall. However, instead of employing the cable and the U-bolts, for connecting the shoes of this form together, it will be noted that the lateral walls of each shoe have apertured ears 16 formed on and extending from the inner ends of the outer edges thereof and the ears on one of the ends are outwardly bent for cooperation with the straight ears of a companion shoe, to receive pivot pins 17 for pivotally securing the shoes together, as will be apparent.

The shoes of the form of Figure 5 also include tread walls 18, and diverging lateral walls formed thereon, which together with the lateral walls 14 of the form of Figure 4, set up a wedging action with respect to the tire, but the means for connecting the shoes of the form of Figure 5 together, include hinge barrels 20 that are formed on and extend outwardly from the ends of the tread walls. I preferably provide a pair of hinge barrels at one of the ends of the tread wall 18, and a single hinge barrel at the opposite end thereof, for disposal between a pair, of companion shoes, as will be apparent and the cooperating hinge barrels have pivot pins 21 extending therethrough for cooperation therewith for connecting the shoes together. However, bolt and nut connections may be employed for that purpose.

In order to prevent the tire from creeping on the rim of the wheel, I preferably provide lugs 22 formed on the rim sections, as shown in Figure 2, to be received in recesses 23 in the tire beads, as best shown in Figure 3.

While I have illustrated the use of suction cups formed by the depressions 4 in the side walls of the tire, for cooperation with the lateral walls of the shoes, I may provide projections on the side walls to be received in recesses in the lateral walls, the projections and recesses just mentioned being identical to the projections 3 and the recesses 7.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

In a traction apparatus for dual wheels of a motor vehicle including tires, an endless belt for travel over the tires and including connected shoes, said tires each having a flat tread surface and side walls diverging therefrom, rounded projections formed on and extending transversely of the tread surface, said shoes each having a flat tread wall and lateral walls diverging therefrom, the tread walls having recesses in the inner surfaces thereof to receive the projections, said lateral walls fitting the side walls of the tires to set up a wedging action of the shoes with the tires, said side walls having recesses therein to provide suction cups for cooperation with the side walls, the wedging action and the projections and recesses to provide a positive connection between the tires and shoes, and calks on the tread walls of the shoes.

EARL DEARDORFF.